(12) United States Patent
Graham et al.

(10) Patent No.: US 7,496,786 B2
(45) Date of Patent: Feb. 24, 2009

(54) SYSTEMS AND METHODS FOR MAINTAINING LOCK STEP OPERATION

(75) Inventors: Simon Graham, Bolton, MA (US); Dan Lussier, Holliston, MA (US); Tim Wegner, Westborough, MA (US); Jeffrey Somers, Northboro, MA (US); Steven Haid, Bolton, MA (US); John W. Edwards, Jr., Lake Worth, FL (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 451 days.

(21) Appl. No.: 11/329,244

(22) Filed: Jan. 10, 2006

(65) Prior Publication Data

US 2007/0174687 A1  Jul. 26, 2007

(51) Int. Cl.
*G06F 11/00* (2006.01)

(52) U.S. Cl. .......................................... 714/12; 714/6
(58) Field of Classification Search ..................... 714/6, 714/10, 11, 12, 13
See application file for complete search history.

(56) References Cited

U.S. PATENT DOCUMENTS

| | | | |
|---|---|---|---|
| 5,896,523 A * | 4/1999 | Bissett et al. ............... 713/400 |
| 2004/0153731 A1* | 8/2004 | Aino et al. ...................... 714/6 |
| 2004/0153750 A1* | 8/2004 | Aino et al. ..................... 714/11 |
| 2006/0150004 A1* | 7/2006 | Mizutani ..................... 714/11 |
| 2006/0150006 A1* | 7/2006 | Mizutani ..................... 714/11 |

* cited by examiner

*Primary Examiner*—Dieu-Minh Le
(74) *Attorney, Agent, or Firm*—K&L Gates LLP

(57) ABSTRACT

A system is provided for rapidly synchronizing two or more processing elements in a fault-tolerant computing system. Embodiments of this system allow for the rapid synchronization of two processing elements through partial copies of the contents of memory associate with each processing element.

10 Claims, 3 Drawing Sheets

SYSTEMS AND METHODS FOR MAINTAINING LOCK STEP OPERATION

FIELD OF THE INVENTION

The present invention relates generally to maintaining lock step operation between processors in a fault tolerant system. In particular, the invention relates to early detection of out of lock events and reinstating lock step operation by selectively updating fault tolerant system components to achieve fast processor re-sync.

BACKGROUND OF THE INVENTION

For many computer applications, such as for example watching movies, playing games, and exploring the Internet, some reasonable level of computer reliability is expected by the end users. However, few home computing enthusiasts expect or require computers that are fully operationally substantially all of the time. This follows because neither the user's needs nor the data or applications in question relate to critical services or transactions. Conversely, if a computer server is used to maintain a nuclear reactor, record financial transactions or store patient medical records, then year round availability is a requirement and not just a performance aspiration. Specialized computer processors, modules, software, and methods are used to achieve extended periods of computer availability that are required by these specialized applications. The systems that use these specialized components to provide enhanced computational availability are generally referred to as fault tolerant systems.

Fault tolerant systems support computer designs that require only a few minutes of downtime a year. Achieving extended computing uptime often requires redundant computing systems with multiple processors, specialized interconnects, and various monitoring and control modules. In particular, one approach to fault tolerant system design uses two or more processors operating in lock step synchronicity. In these lock step systems, the processors perform substantially the same operations and provide substantially the same output data at substantially the same time. Accordingly, if one of the processor fails, a particular transaction or mathematical operation is still in process within the other processor as a result of the dual processing paths. This processing redundancy is advantageous, but not without additional costs and considerations.

Specifically, if the two processors cease to operate in lock step, many, if not all of the benefits of the fault tolerant system are lost. Therefore, a need exists for methods and device to ensure continued lock step synchronicity and to quickly return a system to lock step synchronism when an out of lock event occurs.

SUMMARY OF THE INVENTION

In particular, a need exists for improved methods and systems that sustain lock step operation among fault tolerant system components. Further, a need exists to enable early detection of processor irregularities to enable a quick return to lock step operation. Finally, within fault-tolerant computer systems, a need exists to characterize different types of out of lock events and reinstate deterministic computing among system components in response to the type of error condition. Error conditions that are typically of interest include hardware, transient and non-determinism errors.

In satisfaction of these needs, embodiments of the present invention provide systems and methods for high-speed processor re-sync procedures and devices. Embodiments of the present invention also provide systems and methods for early error detection and categorization. Hardware errors are a class of errors that require removal of a hardware component in order to restore lock step operation in a fault tolerant system. As such, a hardware error is an otherwise fatal error that cannot be corrected without replacing a hardware component. Transient errors comprise correctable or retryable errors (such as a single bit ECC error) that are automatically retried by the hardware and which only cause a change in timing between boards (such as a transaction order reversal on the bus). Nondeterminism errors include events which alter timing but do not change results obtained on different processors. However, if a transient error occurs, the contents of the system memory remains unchanged, if detected within a particular time frame.

One feature of the invention relates to the detection of and response to errors in a fault tolerant system. In part, the invention operates in response to certain behaviors exhibited by the fault tolerant systems disclosed herein. Specifically, when voter errors or other errors are detected in a fault tolerant system, assuming there is no true hardware error, a fast resynchronization, or microsync, procedure is enabled. This is possible because in a fault tolerant system with the two boards containing processing systems, the systems are identical at the time of an initial out-of-lock event. An extra read or a few transposed transactions may occur before the event is detected, but if detected early enough, the memory contents on both processors/boards remains identical. Thus, in part, one aspect of the invention relates to detecting an initial error or an event when the processors on the two boards are architecturally identical. During such an error or pre-error event, the contents of the memory in communication with each processor are identical even though the processors' internal states are not.

In one embodiment, if the initial out of lock event is detected early enough, it is possible to only copy a small subset of memory before returning the processors to lock step operation. Specifically, the stack area of the code that was executing; the SMM save areas and a portion of the application data space can be used as the relevant memory subset in some embodiments. Copying a suitable portion of system memory can be sufficient to return to the sync point by replicating the internal state between one or more boards/processors. Since this is a very small resynchronization operation, it is referred to as a microsync. The following sections present more information on the proposed processes and the hardware and software support required to implement microsync using ASICs, VLSIs, FPGAs, fault tolerant system chipsets, firmware, software and combinations thereof.

The foregoing, and other features and advantages of the invention, as well as the invention itself, will be more fully understood from the description, drawings, and claims which follow. It should be understood that the terms "a," "an," and "the" mean "one or more," unless expressly specified otherwise.

BRIEF DESCRIPTION OF THE DRAWINGS

Reference to the figures herein is intended to provide a better understanding of the methods and apparatus of the invention but are not intended to limit the scope of the invention to the specifically depicted embodiments. The drawings are not necessarily to scale, emphasis instead being placed upon illustrating the principles of the invention. Like reference characters in the respective figures typically indicate corresponding parts.

The claimed invention will be more completely understood through the following detailed description, which should be read in conjunction with the attached drawings. In this description, like numbers refer to similar elements within various embodiments of the present invention.

DETAILED DESCRIPTION

The following description refers to the accompanying drawings that illustrate certain embodiments of the present invention. Other embodiments are possible and modifications may be made to the embodiments without departing from the spirit and scope of the invention. Therefore, the following detailed description is not meant to limit the present invention. Rather, the scope of the present invention is defined by the appended claims.

It should be understood that the order of the steps of the methods of the invention is immaterial so long as the invention remains operable. Moreover, two or more steps may be conducted simultaneously or in a different order than recited herein unless otherwise specified.

The claimed invention provides methods and systems for regulating and correcting the operation of a fault tolerant system incorporating two or more computer processors. In part, aspects of the claimed invention regulate the fault tolerant system by detecting deviations in processor operation and output signals. These deviations typically correspond to hardware errors that cannot be recovered from without installing a new hardware component and transient errors, that are recovered transparently by retrying. In addition to detecting and distinguishing between these error types, the devices, systems and methods disclosed herein regulate a fault tolerant system or its individual components to correct for these error types or indicate when a hardware replacement is required.

Early detection of processor errors is another feature of the invention. The early detection features reduce the likelihood of error propagation in the system. In turn, limiting error propagation allows for microsync methods that reduce overall system downtime. Additionally, these features of the invention may be understood in greater detail in relation to the enclosed figures and claims.

Figure 1:
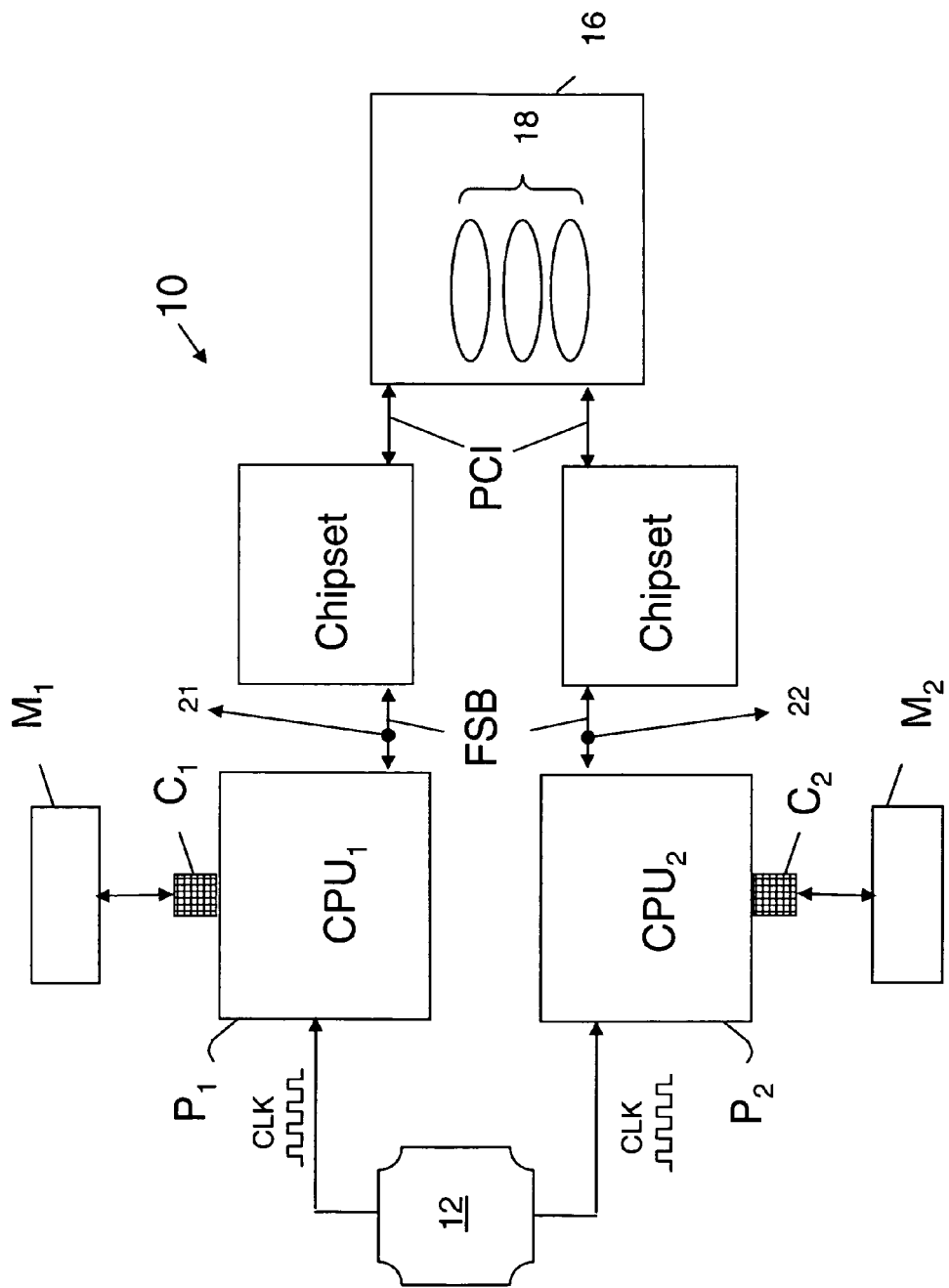
FIG. 1 is a block diagram depicting portions of a fault tolerant system adapted to facilitate fast synchronization of processors following an out-of-lock event in accordance with an illustrative embodiment of the invention.

FIG. 1 is a block diagram depicting a portion of a fault tolerant system FTS 10 adapted to maintain lock step synchronism, in accordance with various embodiments of the claimed invention. As illustrated, FTS 10 preferably comprises two separate computing elements running identical code in lockstep. Although two processors $P_1$ and $P_2$ are shown, it is understood that the scope of the invention also includes three or more processors preferably operating in a lockstep, fault-tolerant fashion. In fact, some embodiments of the invention will include a computer server incorporating a plurality of boards/blades/modules wherein each board, blade or module incorporates some or all of the components shown in FIG. 1. As such, the techniques described herein with respect to processors can also apply to processing subsystems that may contain processors, as well as boards, blades and modules.

As the portions of the FTS 10 shown relate to a lock step system, the processors $P_1$, $P_2$ in the system 10 must be synchronizable. In order for the processors $P_1$, $P_2$ to operate on the same transactions at the same instants in time, they are synchronized to a common clock. Typically, a single reference clock source 12 transmits a clock signal CLK to each of the processors. As a result, each of the processors $P_1$, $P_2$ is synchronized to the common clock source 12. In turn, this synchronous operation facilitates the operation of deterministic fault tolerant system.

Each processor $P_1$, $P_2$ is typically associated with a cache $C_1$, $C_2$. In general, each cache is a small high speed memory element such as Static RAM (SRAM) that is either part of the processor or in electrical communication with it. The cache usually contains the most recently accessed pieces of main memory. However, as cache memory is fast and only used for short term storage, it usually has a limited storage capacity.

For each processor, cache memory $C_1$, $C_2$ is connected between system memory $M_1$, $M_2$ and the processor $P_1$, $P_2$, respectively. As processor access speeds typically far exceed those of system memory $M_1$, $M_2$, each processor $P_1$, $P_2$ is forced to wait for data coming from and being sent to system memory $M_1$, $M_2$. Inclusion of the faster cache memory $C_1$, $C_2$ allows for improved processing efficiency as there is less idle processor time wasted waiting for system memory $M_1$, $M_2$ to catch up with processor calls for data.

In addition to the components discussed above, the FTS 10 also includes a fault tolerant logic subsystem or component 16. The subsystem 16 is responsible for operating portions of the fast processor re-sync methods described in more detail below. As such, by quickly returning the processors to lock step operation after some event, improved FTS 10 uptime and reliability is possible. The subsystem 16 performs multiple functions. These functions in various embodiments include responding to processor/board errors, regulating aspects of cache operation, toggling the microsync operator, responding to FSB signals, and the microsync controller.

The subsystem 16 can be implemented as a chipset, an ASIC, a VLSI, a FPGA or other suitable electronic device implementation. Alternatively, some or all of the subsystem 16 or its components can be implemented using software either alone or combination with the subsystem 16 and its components. In one exemplary hardware embodiment, a processor bus interface (not shown) is used to connect the processors and the subsystem 16 via the Front Side Bus (FSB) or other suitable buses. Generally, the Front Side Bus (FSB) comprises a CPU data bus. This bus carries all information that passes from the CPU to other devices within the system such as RAM, PCI expansion cards, hard disks, etc. In one embodiment, the FSB is monitored to determine early out of lock events (EOOLs).

Moreover, the subsystem 16 can include one or more subsystem components (18 in general). These subsystem components 18 can include, but are not limited to a comparator, a voter, a microsync toggle, a voter delay buffer, fault tolerant logic, buffers, interfaces, buses, a front side bus monitoring element, an SMI handler, and combinations thereof.

A voter is typically used to detect the initial error in one embodiment. A voter is a device or circuit that receives multiple inputs, compares those inputs, and generates an output in response to the inputs. For example, a voter may be a device with three inputs and one output, such that is two or three of the inputs are the same the output is equal to the common inputs. Voting devices can be chained together in an array as part of a fault tolerant system to process multiple inputs from multiple processors. In one implementation a comparator is used to compare the outputs from the processors and alarm if any deviations occur.

Prior to discussing the subsystem 16 and any subcomponents 18 in more detail, it is informative to consider the subsystem's general objective; fast multiprocessor re-synchronization. During normal operation both processors execute the same input/output transactions at the same time. Transaction processing and code execution are synchronized in time according to the system clock signal CLK that is common to the different processors. Ideally, each processor executes the same input and output transactions during the same part of a clock cycle. However, sometimes a difference may occur in I/O transactions due to correctable errors or non-deterministic processing paths within the processor. As discussed above, these are transient errors that do not correspond to the errors associated with processor hardware failures. When transient errors are detected, a fast processor re-sync procedure can be initiated rather than the slower approach associated with a hardware component replacement. Thus, if the slower approach is used each time there is a minor deviation between processor transactions, fault tolerant system uptime is needlessly reduced.

Accordingly, the microsync methods disclosed in more detail below have a number of advantages. First, a microsync does not require copying the full system memory, as is the case with a fatal hardware error. For example, if a full memory copy is required in accordance with existing methods known to those in the art, it can take 20 to 30 seconds to copy memory from one board to another and run diagnostic routines. In contrast, the microsync methods can be performed in less than 200 ms, as they typically only require cache flushes, copying small amounts of memory, and the processor resync procedure.

In alternate embodiments, time required for a microsync copy may vary depending on the amount of data transferred and the speed of the data transferring hardware. To achieve the benefits of microsync, the amount of data transferred is preferably a small fraction of the total amount of data stored in memory. For example, in an embodiment where 4 GB of data would have to be copied in a full resynchronization, less than 10 MB of data would need to be copied in a microsync. Thus, the amount of time required for synchronization may be reduced by a factor of 400 or more. In various embodiments, it is foreseeable that the data transferred by a full synchronization may be at least one and as much as five orders of magnitude greater than that required in a microsync.

Figure 2A:
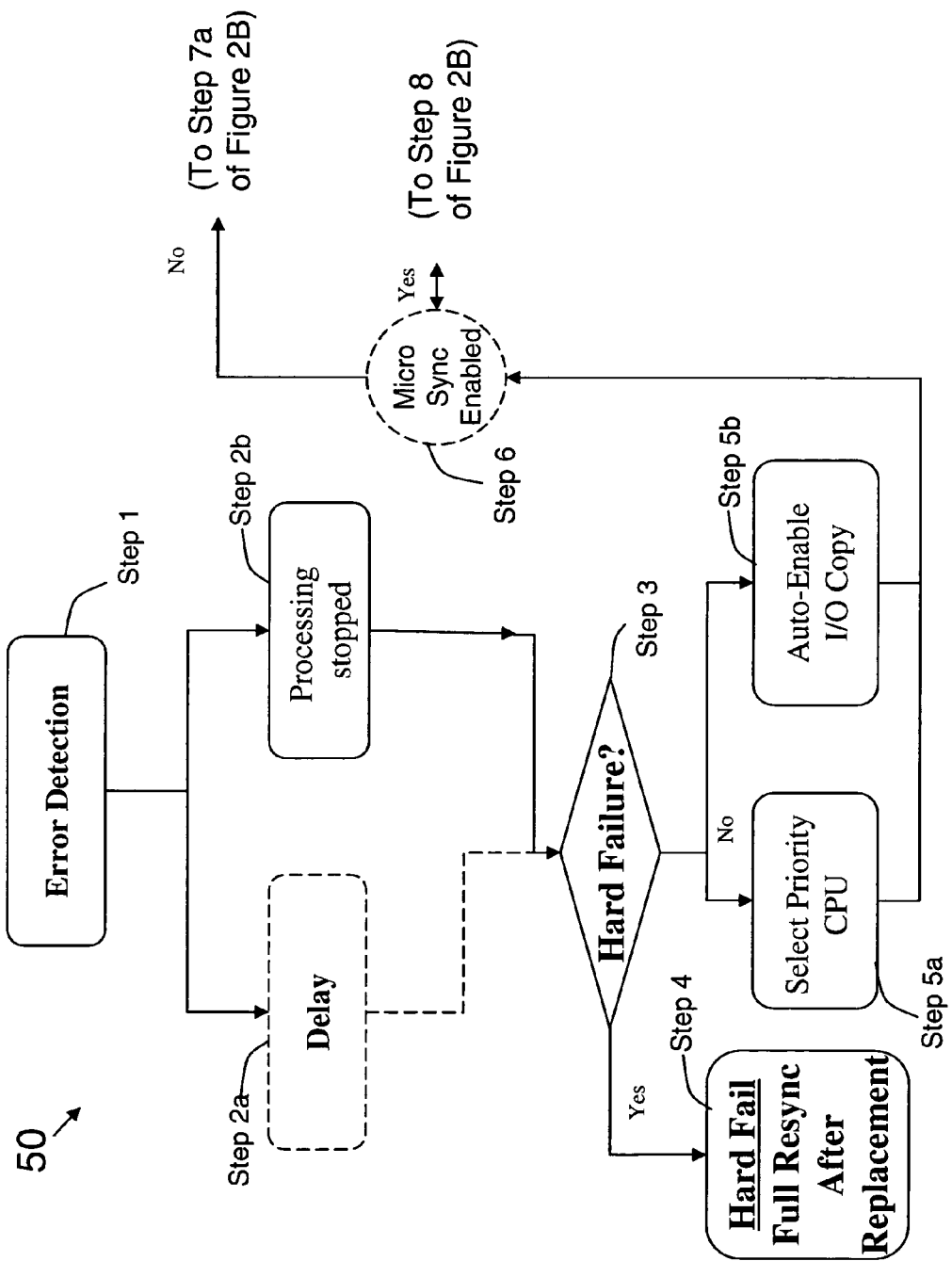
FIGS. 2A and 2B are flowcharts illustrating an exemplary method for synchronizing processors following an out-of-lock event.
Figure 2B:
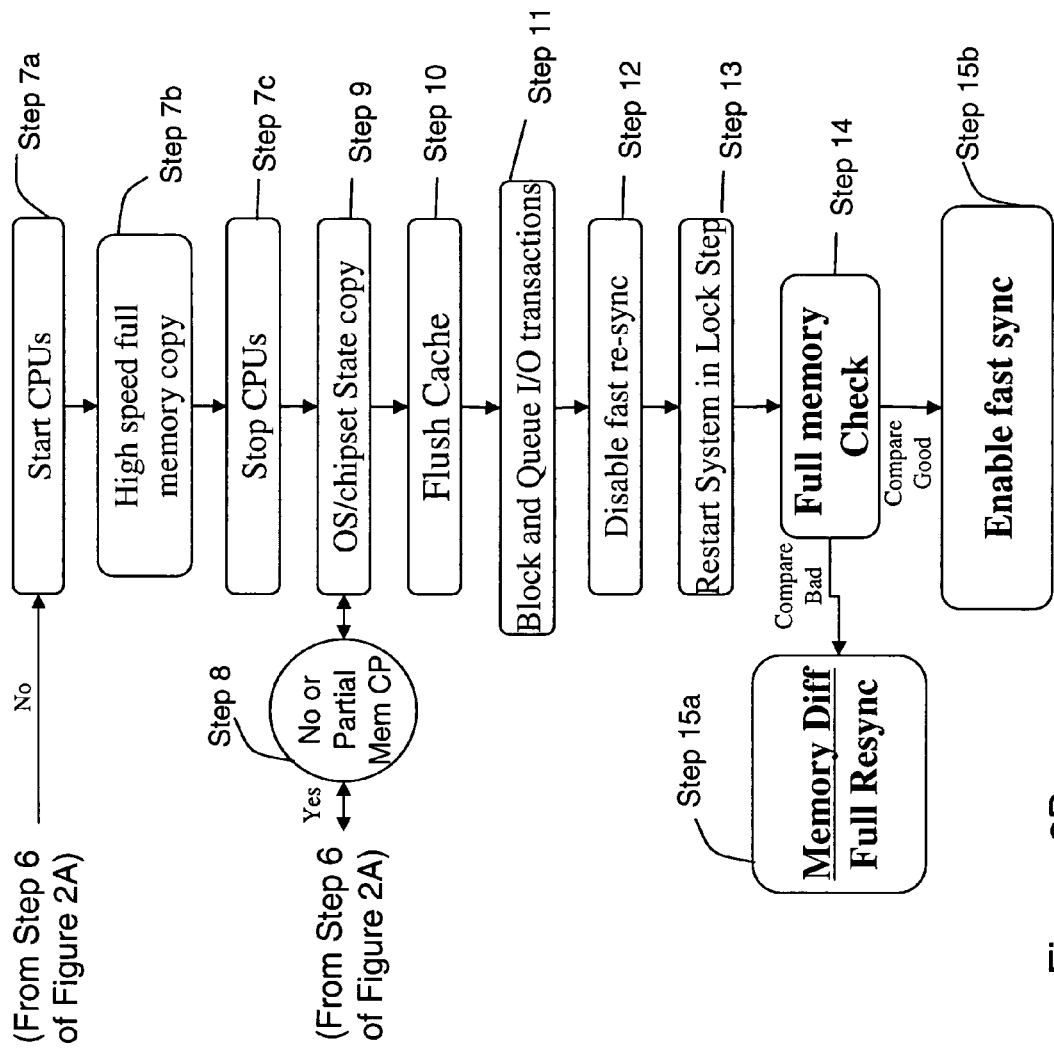

FIGS. 2A and 2B depict some of the processes involved when a microsync operation is performed. As depicted, the microsync method 50 represents different steps that occur in response to certain events. These processes can be implemented in hardware, software, firmware and combinations thereof. Various software implementations can be designed to run within the operating system environments running on the processing systems used in a given fault tolerant system.

As shown in FIG. 2A, during normal operation the processors are in lock step synchronism and are operating on input data to generate processor output streams. Exemplary processor output, such as those indicated on the FSB of processors $C_1$, $C_2$ in FST 10, of FIG. 1 can be monitored using various techniques. Thus, as part of the normal operation of a fault tolerant system the processors are monitored to detect errors (Step 1). This error detection process (Step 1) is typically continuous, until an error is detected. Additional details relating to error monitoring and detection are discussed in more detail below in relation to specific embodiments. However, any processor or board errors are suitable for the monitoring step described in (Step 1).

As discussed above, error detection and the errors themselves raise two important considerations. The first consideration is whether the error is a transient error or a non-recoverable hardware error. The second consideration is the speed with which the error can be detected. Transient errors are particularly susceptible to becoming uncorrectable as a result of slow error detection. This occurs because the longer an error goes undetected, the greater impact the error has on processor state function. As such, some of the re-sync approaches described herein rely, in part, on early detection of errors to ensure that certain memory portions, such as the system memory, remain identical between processors, even if there are transient deviations in processor states. Preferably, this early detection takes place within one or two FSB cycles. Since the memory is already correct on both boards, the entire system memory need not be copied; all that is required is to get the processors running in lock step again. Because a full board memory copy is not necessitated, a microsync procedure is possible.

Again referring to FIG. 2A, once an error has been detected (Step 1), such as detecting different I/O transactions which are occurring on the two boards or different signals occurring on the respective FSBs associated with each processor, the next step is to initiate a delay (Step 2a). During the delay period, all traffic on the PCI bus is halted and the processors are interrupted (Step 2a). The delay period is typically controlled via hardware, but software implementations are also possible. In one embodiment, the delay period ranges from about 10 milliseconds to about 100 milliseconds. In the preferred embodiment, the delay period is about 68 milliseconds.

The cessation of processing (Step 2B) is designed to prevent any detected errors from becoming worse. Thus, as soon as a transient or hardware error occurs, the processors are prevented from executing additional transactions that may amplify the error. A system management interrupt (SMI), controlled by an SMI handler, is used to stop the processors in one embodiment; however, other methods and protocols can be used to stop processor operation. The internal state of one of the processors at the time of the processor halt can be used at a later time to bring one or both processors back into service with the same internal state.

One reason for the delay period is to see if a board will declare itself as experiencing a hardware failure. Thus, the next step is to determine if there is a hardware component failure or if there is another type of error such as a transient error (Step 3). There are a number of signals that are instrumented on a processor, such as an internal error signals or temperature alert signals that can be sent during the delay period. If one of these signals occurs, the failed board is identified and can be taken out of service. Alternatively, bus error or other signals (e.g. BERR or IERR) can be monitored to determine board/processor hardware error(s). During such an event, the microsync is not used.

If a hardware error has occurred, the next step is to take the damaged processor/board of the FTS out of service and replace it (Step 4). However, if no hardware failure occurred, a series of parallel events occur. Initially, the status of the processors is determined (Step 5a). Typically, one of the processors or boards is chosen as the primary processor. The primary status indicates that the particular board/processor is operating normally. The secondary board is taken off line. In one embodiment, the secondary board is placed into an infinite loop waiting to be reset by the online board with updated memory, consistent with the primary board as discussed below.

Thus, the primary board/primary processor will control the process of restoring the secondary board/secondary processor and re-initiating overall lock step operation. Since the errors are transient, both boards/processors can be functionally normally, albeit not in lock step synchronicity. Therefore, the selection of a primary and secondary processor is arbitrary for a transient error. The primary processor continues running and is in charge of fixing the other processor, restoring its memory and executing the relevant steps of the microsync process that require processor state information. The internal processor state of the primary processor is saved and is used to update the secondary processor as discussed below. The secondary processor is subservient to the primary processor. In one embodiment, the secondary processor remains on-line with all processing stopped.

Prior to bringing the entire fault tolerant system back to lock step operation with the primary and secondary processors synchronized and processing normally, certain steps are performed to ensure data is consistent between the two processing systems. Specifically, during the initial error detection (Step 1), memory contents of both boards/processing systems were identical. Microsync typically includes various procedures that are automatically enabled (Step 5b) to make sure the relevant memory contents remain identical.

Although previously (Step 2b) the processors stopped operating on input data, the I/O devices associated with the fault tolerant system continue to run. The data generated by these devices can modify memory. Since the microsync procedures avoid a full memory copy by design, these later memory changes can be problematic. When an I/O device writes to main memory on the primary board, the memory write is replicated to the second board that will be brought back into service to return to full lock step operation. This is consistent with the overall operation of the microsync procedure which is to keep the memory contents associated with the primary and secondary processors the same. The process of replicating I/O device writes (Step5b) or other memory changes from the main board memory to the memory of the secondary board that is coming into service helps ensure that the processor being brought into service will operate in lock step with the primary processor.

Now that all of the relevant memory writes have been replicated, the next step in the method changes depending on whether or not microsync is enabled (Step 6). The additional steps that follow as function of the microsync toggle are shown in FIG. 2B. If microsync is not enabled, the primary and secondary processors are restarted (Step 7a). The longer, full scale memory copy is performed (Step 7b) and both processors are stopped (Step 7c). The additional steps relating to the microsync enabled path, starting with Step 8, are then also performed in one embodiment.

If the microsync procedure has been is enabled (Step 6), a partial memory copy may occur. The partial memory copy may include writing all of the processor state information /board information from the primary board to the secondary board (Step 8). However, if there are no deviations or changes in the code path from the primary and secondary processors, this step may not be needed.

Occasionally, when an EOOL is detected, one processor $P_1$, $P_2$ may have performed memory writes that the other processor has not yet performed. For example, this may occur when: a transient error causes one processor to fall behind the other by one or more cycles; the processor that is ahead performs a memory write; or, the EOOL SMI occurs prior to the other processor performing the same memory write.

Preferably, following the EOOL, the software contained in the SMI handler running on the high priority processor assumes that such a memory difference may exist. Accordingly, the SMI handler will copy various memory locations that may contain differences. To pinpoint these locations, the values of processor registers at the time of the EOOL SMI are utilized to infer the memory locations that may have been recently modified, through the following techniques.

First, memory segment descriptor registers are examined. If any memory segment is small (preferably less than about 64 k in size), then those memory segments are copied in their entirety. Next, the stack and frame pointer registers are inspected, and a memory range is constructed that starts below the stack pointer and extends above the frame pointer, such that the current stack frame as well as portions of stack frames above and below are copied. Thereafter, general purpose registers (for example, eax, ebx, ecx, edx, esi and edi on an x86 processor) are inspected and a range of memory locations centered on each register value is copied. In this fashion, the partial memory copy extends to memory locations besides those which include processor state information.

Next, the operating system (OS)/chipset state copy (Step 9) is performed. In one embodiment, (Steps 8 and 9) correspond to one step.

Thus, after (Step 9) the two processors/boards memories should be identical. The processing system cache, such as $C_1$, $C_2$ in FIG. 1, are flushed (Step 10) prior to initiating lock step operation between the boards/processors. In addition, in one embodiment, the cache information is written back to main memory before the flush such that the memory contents associated with primary and secondary boards are identical. The cache flush is then performed because the processors need to be reset and start operating again with the same memory and code paths. Cache flushing is the mechanism by which a processor clears its cache. A cache flush may result from actions in either hardware or software.

Prior to bringing both processors into synchronized operation, the processors are typically stopped as I/O transactions have been occurring and are accumulating in a queue for processing (Step 11). Although previously in (Step 5b) I/O transactions were captured and replicated, since the memory associated with each board is equivalent, new I/O transactions are queued rather than replicated to both boards, to prevent memory deviations. In one embodiment, this step is referred to as a freeze mode as it queues up all I/O transactions while the processors are frozen before the re-sync. Freeze mode does not allow I/O writes to processor memory or otherwise change the processor internal state at this stage in the overall re-sync process.

As the process of monitoring the fault tolerant system for errors is continuous in time, the next step is to disable the microsync functionality into an off-state (Step 12). This is necessary because to handle circumstances where there is a real memory difference that is not corrected by (Step 8). Therefore, after the processors/boards are restarted in lock step operation (Step 13) using the saved processor state information. A memory verification step may then be performed (Step 14) either immediately thereafter, or at a later time. In one embodiment, the memory is checked by hardware reading all of memory from both boards and comparing the results using the normal voting mechanism. However, other memory verification techniques can be used as are known in the art.

If, as a result of the memory verification step, memory differences are found to exist (Step 15a), a full re-sync operation is performed that includes the slower full memory copy procedure associated with hardware errors. In contrast, if the memory is consistent between the two processors, the microsync was successful. Given a successful memory test (Step 14), the microsync introduced with (Step 6) and previously disabled in (Step 12) is now again enabled (Step 15b). Thus, the fault tolerant system was quickly re-synchronized following a transient error. As a result, the method returns to (Step 1) wherein error detection is resumed. The fault tolerant system continues to remain in the error detection step until a hardware or transient error occurs. The steps of the method and the determination of whether an error is a hardware or transient error is made for each iteration of the method described in FIGS. 2A and 2B. This microsync implementation helps ensure improved fault tolerant system up time.

The overall fast procedure represents significant time savings when compared to a system that treats all errors as hardware errors with the associated full memory copy. Various details relating to specific embodiments of the invention can be implemented are described below.

DETAILS OF SPECIFIC EMBODIMENTS AND IMPLEMENTATIONS

As discussed above various aspects of the invention can be implemented using either a hardware or software approach. Specifically, the fault tolerant logic component described herein can be implemented using either approach. However, certain aspects of the invention are tied, at least in part, to a hardware device.

Error Detection

For example, a voter, comparator, or other error detection mechanism is preferably used to detect that a particular transaction or data element indicative of a non-hardware error, is different in the output streams of two processors (for example at 21, 22 in FIG. 1). Additionally, a voter delay buffer (VDB) can be used alone or in combination with a voter or other error detection mechanism. The VDB collects output streams from two or more processors. The VDB is used to collect output data streams when a voter indicates that there is a miscompare between the processor output streams. Specifically, the voter delay buffer holds the data in the two streams until the system can determine which of the two on-line CPUs is properly functioning, and thus, which of the two output streams is valid. The comparison logic then passes the valid output stream to the appropriate system components.

Alternatively, error detection may be achieved through the use of specific signals that are transmitted from the boards connected to the processors or by specific sensors. Thus, the implementation shown in FIG. 1 can include signals reporting processor errors, correctable memory errors and uncorrectable memory errors. Given the proximity of where the signals are measured, such at points 21, 22 in FIG. 1, early detection is possible before a transient error becomes unmanageable and leads to excessive memory deviations. In addition, early error detection may also be facilitated through the use of the Address Strobe signal. Thus, early detection prevents error propagation that may preclude a microsync because a full memory copy is not necessitated.

Thus, hardware components are typically used to assist in the early detection of an out-of-lock event. For example, a voter, VDB or other device something that compares ADS and BREQ on the boards can be implemented. In one specific an implementation, upon detection of an error, three events can be triggered. First, an SMI is delivered in lockstep to all online boards; as fast as possible to control error propagation. Second, a voter error is transmitted to the fault tolerant logic component, typically a fault tolerant system ASIC, VLSI, or software module, such that the system can begin monitoring/waiting for a signal that may announce that the error is a true hardware error. Finally, once the wait for true error is complete (delay period expiration) and a no hardware error is announced, one board is selected, typically arbitrarily, as responsible for the error and is deemed the secondary board/processor. The secondary board/process enters an offline state and the I/O copy mode described with respect to (Step 5b)

above can be enabled automatically. Alternatively, the device that generated the SMI, typically an SMI handler is adapted to the I/O copy mode. In one embodiment, any resultant voter error is signaled to the VDB, causing it to engage and begin waiting for a hardware failure indication, until the delay period expires.

I/O Copy Details

In part, implementations of the microsync technique rely on the assumption that memory differences between two or more processing systems will be relatively insignificant after the out of lock event. Processor initiated memory differences are controlled for via software in one embodiment. However, I/O initiated writes are typically sent to both boards in order to maintain the consistency desired for a microsync. Write broadcasting can be incorporated as a feature in the fault tolerant logic component described herein. Thus, a chipset incorporating write broadcast functionality can handle writes to memory initiated by the processor as well as the I/O traffic. Unfortunately, there can be a window in which writes from I/O may occur between the time of the divergence of the processors and when write broadcasting is turned on in the chipset.

In order to address this issue, in one embodiment the SMI handler, which can be implemented in hardware and software, enables write broadcasting in the chipset. The window opens when the processor cannot service the out-of-lock SMI until the VDB has timed out. The processor can only take an SMI on instruction boundaries. If the instruction outstanding is waiting for a read to PCI to complete, that read may not complete until the VDB has timed out. However, certain types of I/O traffic do not stop during this time. For example, I/O devices on the PCI bus may be engaged in direct memory access (DMA) operations that directly modify main memory. Even though the processors are quickly halted, these operations continue asynchronously. Accordingly, embodiments of the invention ensure that any memory changes made as a result of I/O device DMA operations are made to both boards to keep the memory contents the same.

Specifically, by setting the low priority CPU board (secondary) to the offline state and enabling an automatic I/O copy mode, memory consistency can be preserved, despite the I/O traffic, such that the microsync is possible. In one embodiment, the automatic I/O copy mode is able to be turned off, once write broadcasting is enabled, to ensure that certain memory writes are not written to the offline board twice.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

What is claimed is:

1. A microsync method of returning a fault tolerant system to lock step operation, the fault tolerant system having two processing subsystems, the method comprising the steps of:
   detecting an error, the error corresponding to an out of lock event in the fault tolerant system;
   halting processing in the two processing subsystems;
   waiting for a delay period, the delay period set to allow for a declaration of a hardware error;

setting processing subsystem priority after the delay period such that one processing subsystem is primary and one processing subsystem is secondary;

copying processor state information for the primary subsystem to the secondary subsystem; and returning the primary subsystem and the secondary subsystem to normal operation within a re-sync period.

2. The method of claim 1 wherein the re-sync period ranges from about 10 milliseconds to about 200 milliseconds.

3. The method of claim 1 wherein the delay period is less than about 90 milliseconds.

4. The method of claim 1 wherein the step of setting processing subsystem priority is performed if a memory for each of the processing subsystems is identical.

5. The method of claim 1 further comprising the steps of if an error is detected, disabling one or more steps in the microsync method until a memory verification step is successfully completed.

6. A method of regulating lock step operation in a fault tolerant system, wherein the fault tolerant system comprises a first processor and a second processor, the first and second processors each having an internal state and memory, the method comprising the steps of:

halting further processing by the first and second processors in response to an error such that contents of the memories associated with the first processor and the second processor remain identical;

adjusting the internal state of the second processor such that it corresponds identically with the internal state of the first processor;

copying I/O transactions from memory associated with the first processor to memory associated with the second processor to ensure identical processing queues after re-sync; and re-syncing the first and second processors and restoring lock step operation within a re-sync period.

7. The method of claim 6 wherein the re-syncing comprises completing a partial copy of the contents of memory associated with the first processor to memory associated with the second processor.

8. A fault tolerant system adapted to maintain lock step operation having a system clock, the system comprising:

a first processing subsystem having a first internal state that changes over time, and a first memory element;

a second processing subsystem having a second internal state that changes over time, and a second memory element; and a fault tolerant logic component in electrical communication with the first and second subsystems, the fault tolerant logic component adapted to:

a) halt the processing subsystems and prevent further internal state changes;

b) replicate processing transactions between the processing subsystems;

c) regulate lockstep operation of the two processing subsystems; and d) re-sync the first and second subsystems in lockstep in accordance with a particular cycle of the system clock within a re-sync period.

9. The fault tolerant system of claim 8 wherein the re-sync period ranges from about 10 milliseconds to about 200 milliseconds.

10. The fault tolerant system of claim 8 wherein the fault tolerant logic component is selected from the group consisting of a VLSI circuit, an ASIC, a motherboard chipset, software, firmware, and combinations thereof.

* * * * *